July 7, 1936.  G. R. KILGORE  2,046,688
MAGNETOSTATIC OSCILLATOR WITH INTERNAL OSCILLATING CIRCUIT
Filed March 30, 1934  3 Sheets-Sheet 1
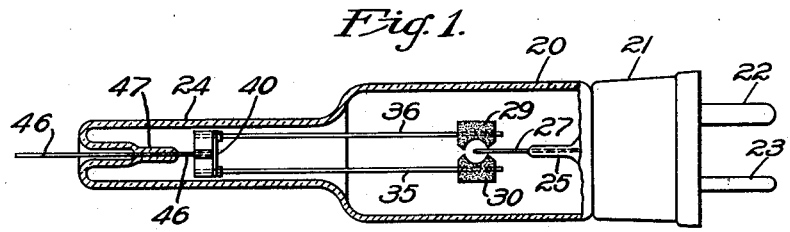
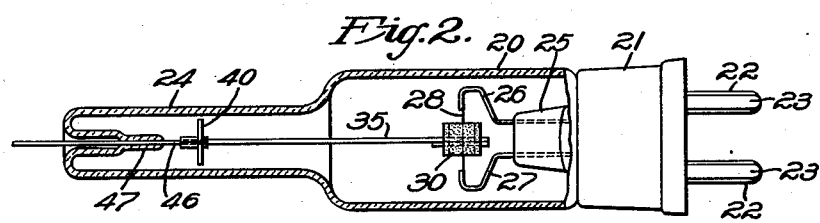
   
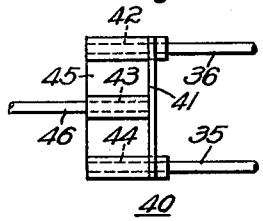 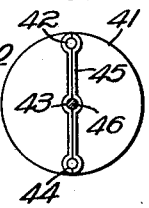 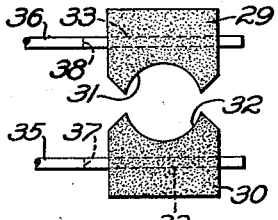 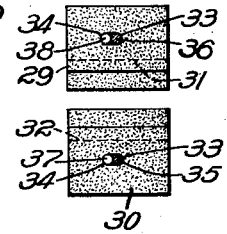
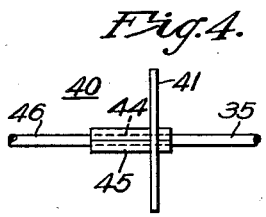 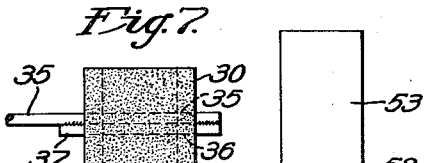
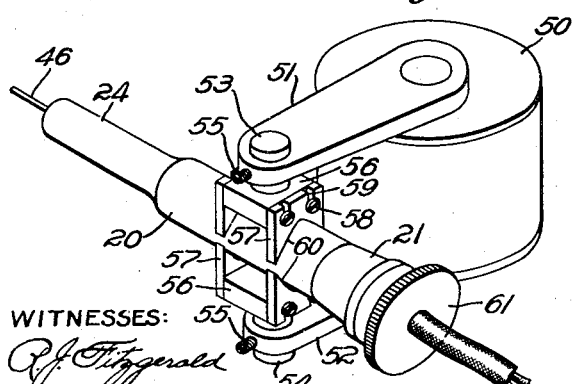 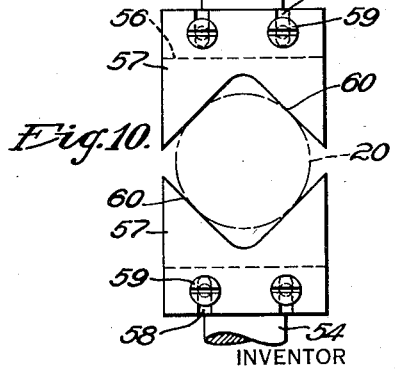
WITNESSES:
INVENTOR
George R. Kilgore.
BY
ATTORNEY

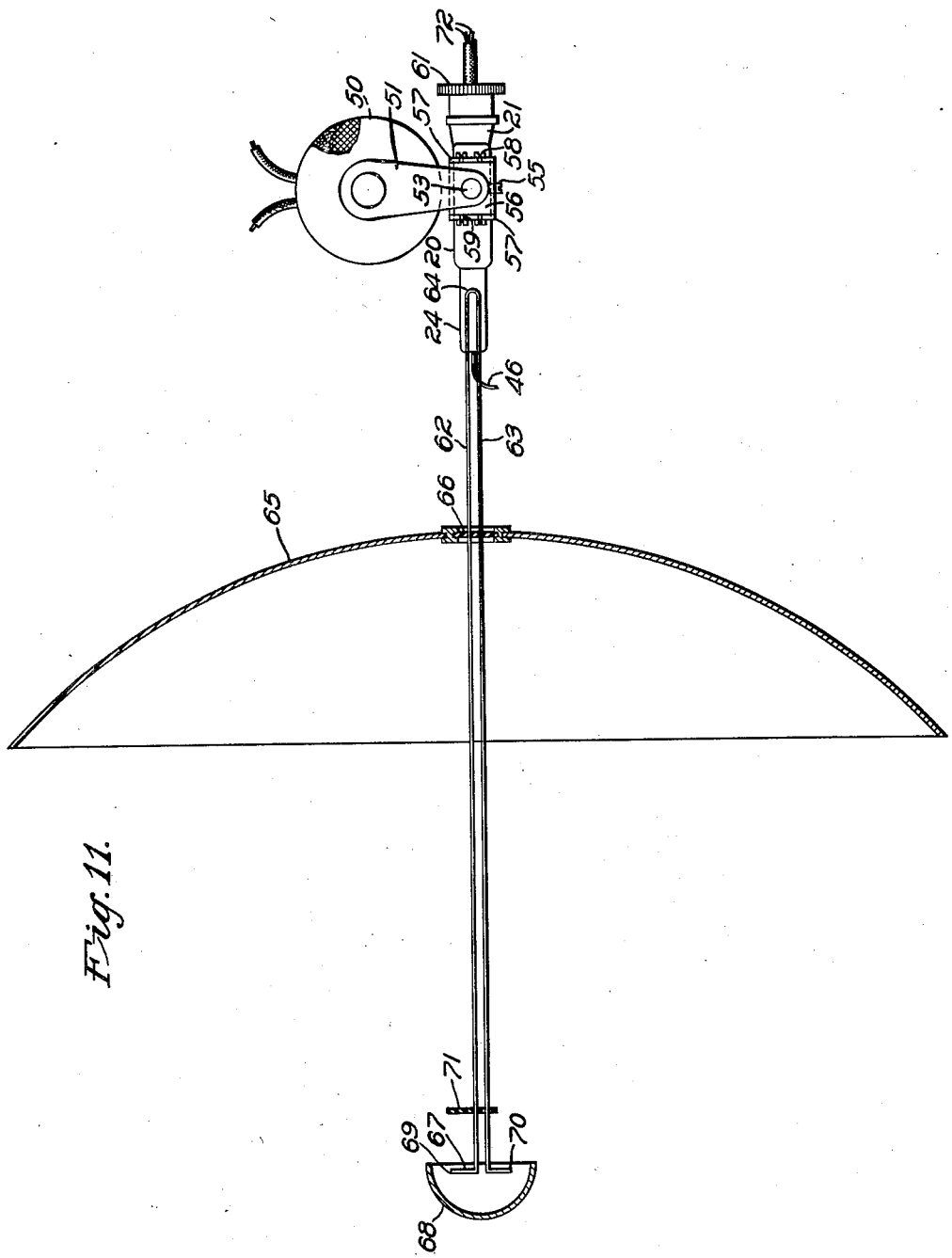

July 7, 1936.    G. R. KILGORE    2,046,688
MAGNETOSTATIC OSCILLATOR WITH INTERNAL OSCILLATING CIRCUIT
Filed March 30, 1934    3 Sheets-Sheet 3
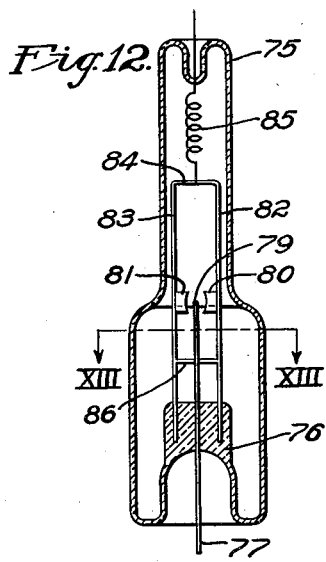
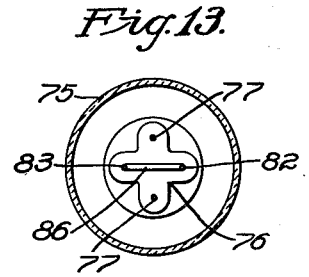
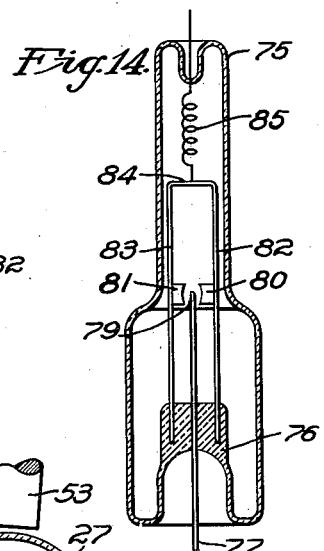
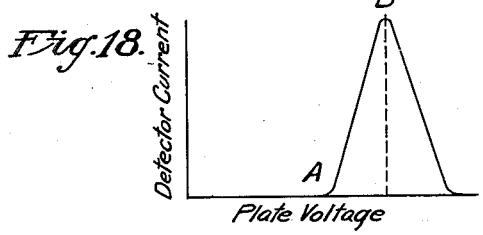
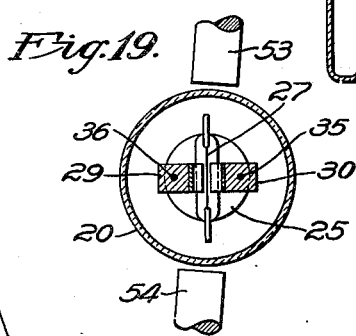
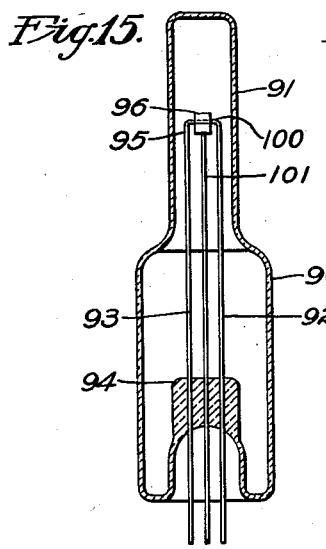
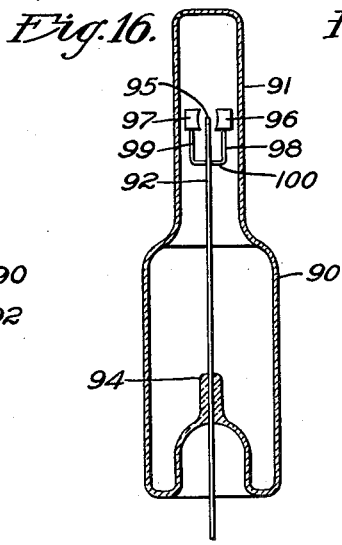
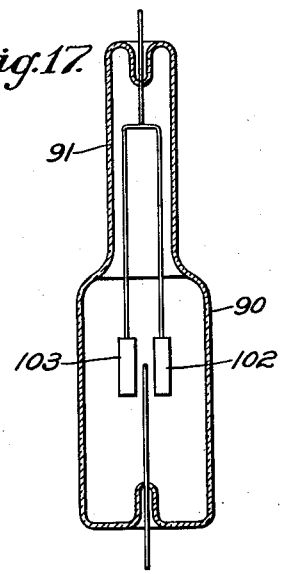
WITNESSES:
INVENTOR
George R. Kilgore.
BY
ATTORNEY Patented July 7, 1936

2,046,688

UNITED STATES PATENT OFFICE 2,046,688

MAGNETOSTATIC OSCILLATOR WITH INTERNAL OSCILLATING CIRCUIT

George R. Kilgore, Forest Hills, Pa., assignor to Westinghouse Electric & Manufacturing Company, East Pittsburgh, Pa., a corporation of Pennsylvania Application March 30, 1934, Serial No. 718,280

8 Claims. (Cl. 250—27.5)

My invention relates to oscillators and it has particular relation to oscillators for the generation of ultrashort waves.

An object of my invention is to provide an electronic oscillator of the magnetostatic type for generating wave lengths of less than 10 centimeters.

In my copending application, Serial No. 620,395, filed July 1, 1932, for Magneto-static oscillators, I described an oscillator especially adapted for generating wave lengths of less than 50 centimeters with a more efficient output than those of the prior art when generating waves below one meter. Prior to my invention described in Serial No. 620,395, the tubes of the prior art that might possibly generate waves below one meter were merely laboratory playthings. The tube described in this copending application produced an efficient output whereby the waves could be directly transmitted similar to light beams and they do not follow the curvature of the earth.

The object of the present invention is to still further improve the structure so that useful oscillations may be produced of wave lengths of 10 centimeters and less and in fact I have produced wave lengths even down to 1.75 centimeters with the structure herein described and no doubt still smaller wave lengths can be obtained even less than one centimeter.

The magneto-static oscillator is founded upon the principle that the wave length is determined by the flying time of the electron in passing from the cathode to the anode in this type of tube. A magnetic field prevents the electron from taking a direct path from the cathode to the anode and forces it to make a curved path thereto. In my prior filed aplication, Serial No. 620,395, I described my invention of making the lines of force of the magnetic field at a slight angle to the axis of the cathode and thereby producing the unexpected result of a big increase in output so that the oscillations became of practical value. I ascribe this increase in output as due to the path of the electron being changed into a helix in place of being merely curving outwardly to the anode.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which Figure 1 is an elevational view with parts in section of a tube incorporating my invention, Fig. 2 is a similar view of the tube of Fig. 1 at right angles thereto, Figs. 3, 4, and 5 are enlarged detail views of the side, bottom and end respectively of the bridge shorting the anode conductors in Figs. 1 and 2, Figs. 6, 7, and 8 are enlarged detail views of the side, bottom and end respectively of the anodes of Figs. 1 and 2 and their method of support from the conductors thereto, Fig. 9 is a perspective view of the magnetostatic tube with a particular type of magnetic means applied thereto, Fig. 10 is an enlarged view of the clamps between the pole pieces and tube of Fig. 9, Fig. 11 is an elevational view with some parts in cross section of a transmitting apparatus for transmitting the oscillations created by the magnetostatic oscillator, Fig. 12 is a modification of the interior structure of the tube shown in Fig. 1, Fig. 13 is a sectional view taken on the line XIII—XIII of Fig. 12, Fig. 14 is a still further modification of the tube disclosed in Fig. 12, Fig. 15 is a modification of the structure of the magnetostatic oscillator especially adapted for wave lengths between 1 and 2 centimeters or less, Fig. 16 is a view at right angles of the tube in Fig. 15, Fig. 17 is a magnetostatic oscillator having flat anodes, Fig. 18 is a curve showing the operating characteristic of the magnetostatic oscillator, and Fig. 19 is a cross section through the tube illustrating the angle of the cathode with the lines of force between the pole pieces.

In Figs. 1 and 2 is disclosed the air tight envelope 20 which is preferably highly evacuated and connected to a base 21 having the outside connections 22 and 23 for connection to a suitable cathode heating current. The opposite end of the tube 24 is preferably of very small diameter for close coupling with the output circuit as will be hereinafter explained. This end 24 may be circular or elliptical as desired. The cathode connections pass through the press 25 as conductors 26 and 27. The inner ends of these conductors are spaced apart and a straight tungsten wire 28 preferably connects the inner ends of these two wires 26 and 27 to form the electron emitting portion or cathode proper.

This wire 28 is preferably at right angles to the longitudinal axis of the tube.

A plurality of anodes and preferably two, 29 and 30, are placed about this cathode 28. The structure of these anodes is more clearly shown in Fig. 6. The adjacent faces 31 and 32 of the anodes 29 and 30 are symmetrical with respect to the cathode. As shown in Fig. 6, the major portion of these adjacent surfaces 31 and 32 form the surface of a cylinder with the cathode as an axis therefor.

These anodes are preferably of carbon and the use of carbon presents a problem of support which has been solved as shown in Figs. 7 and 8. Two adjacent holes 33 and 34 are drilled through the carbon blocks 29 and 30 and the conductor 35 is passed through one of these holes. A similar conductor 36 is passed through a corresponding hole in the other anode. A short rod 37 is put in the adjacent hole 34 to the connector 35; also another short rod 38 is placed in the hole 34 adjacent the rod 36. The ends of the rod which project from the carbon anode are fastened to the respective conductor rods 35 and 36 and preferably by welding thereto. This method of attachment provides a very easy assembly for the carbon anodes and an assembly that will prevent any twisting or turning of the carbon block about its connector rod that might result in destroying the symmetry of the anodes with respect to the cathode.

The two anode conductors 35 and 36 extend parallel to each other as disclosed in Fig. 1. These two conductors are shorted by a bridge at a distance preferably ½ wave length which it is desired to transmit or receive. The preferred structure of this bridge 40 is disclosed more particularly in Figs. 3, 4, and 5. This bridge is preferably a molybdenum disc 41 with three aligned holes 42, 43, and 44 with a raised portion 45 for firmly connecting the conductors to the bridge. The two outer holes are for the conductors 35 and 36 while the center one is for the anode lead 46 that passes through the press 47 to connect to the high voltage direct current lead. It will be noted that the bridge 40 and the connection to the anode terminal 46 continues the symmetry of the tube in respect to the parallel conductors 35 and 36.

The oscillating circuit is constituted by the disc 40, the parallel conductors 35, 36, the anodes 29, 30 and the flying space for the electrons between the cathode 28 and the surface of the anodes 29, 30. The current in the circuit is of very high frequency. For a 10 centimeter wave length tube, the frequency would be 3000 megacycles. As explained in connection with Fig. 11, this oscillatory circuit is inductively coupled with output apparatus. This oscillatory current does not pass through a conductor sealed through the container and accordingly there is no loss due to reflection of the waves from the seal and no dielectric loss, as there are in tubes of the prior art. Because of the small value of the current in this oscillatory circuit, the saving of this ordinary loss of energy results in a very large percentage increase in oscillatory current in these tubes over the tubes of the prior art. Only the power input has to pass through the seals 25 and 47 but not the high frequency current.

Fig. 9 discloses an assembly of the tube, together with the means for producing a magnetic flux across the tube.

Fig. 10 is a detailed view of a preferred means for holding the tube in place in regard to the pole pieces of the magnet. The source of magnetic flux may be the coil 50 with two extending arms 51 and 52 extending from its axis and having in these arms pole pieces 53 and 54 that may be fixed in relationship to each other by the nuts 55. On the shaft of these pole pieces is a block 56 of some non-magnetic material with non-magnetic plate pieces 57 on two sides thereof. These plate pieces 57 may be adjusted up and down by the familiar slot and screw means 58 and 59. These plates have a V-shaped edge 60 for clamping therebetween the body of the tube 20 as illustrated in Figs. 9 and 10. The base of the socket 21 in Fig. 9 may have a large disc 61 with a knurled edge by which the tube may be twisted around so that the cathode 28 may be placed at the desired angle with the flux as illustrated in Fig. 19. If desired, a worm gear arrangement may be attached to this disc 61 similar to the worm gear disclosed in my prior filed application, Serial No. 620,395, previously referred to, in order that the angle of the filament with the magnetic flux may be adjusted with precision. This angle may be from 3° to 14° and is preferably about 5°.

In Fig. 11, I have disclosed an assembly of the oscillator with an output system. The tube 20 is disclosed with the coil 50 for producing the desired magnetic flux across the tube. The heater wires 72 for the cathode and also the anode 30 connection 46 is disclosed on these drawings. The coupling circuit preferably comprises two parallel wires 62 and 63 extending along or resting upon the reduced diameter 24 of the tube 20 adjacent to and parallel with the interior wires 35 and 36. The reduced diameter 24 of the tube permits very close coupling between the wires 35 and 36 and the wires 62 and 63. These two exterior wires 62 and 63 have their ends joined together and this may be most conveniently formed by using one wire with an end loop 64 as clearly disclosed. These two wires pass through a reflecting parabolic reflector 65 but of course are insulated from it by any convenient means such as the insulation 66. A dipole antenna 67 is placed at the focal point of the parabolic reflector 65 and a small hemi-spherical reflector 68 is placed about it with its open end facing the parabolic reflector 65. The distance from one end of one pole 69 of the antenna to the end 70 of the other pole is approximately ½ of the wave length to be transmitted. The wires 62 and 63 are conveniently supported by any insulating support such as 71 which is preferably placed at a nodal point of voltage distribution on these wires. The support 66 of the shield is also preferably at a nodal point of the voltage distribution on these wires. In the operation of the device oscillations are produced on the interior of the tube 20 oscillating on the wires 62 and 63 by the inductive coupling therebetween. The ultra short waves radiated from the antenna 67 are reflected by the reflector 65 and directed in parallel rays toward the receiving system. The receiving system may consist of a similar set of reflectors, antenna and transmission line except that the oscillator tube is replaced by a detector tube. In some cases the detecting device, such as a crystal detector, may be placed directly at the focus, in which case the transmission line is unnecessary.

Various modifications may be made of course in the structure of the tube. Figs. 12 through 17 disclose certain modifications which I have found have been very effective in producing very small wave lengths. Figures 12, 13, and 14 disclose a device in which both the anodes and the cathode were supported by a press at one end of the tube with the anode lead extending out through the opposite end of the tube. This structure has the advantage of higher insulation between the filament and the plate and reduces coupling between the filament and plate leads. The structure presents the problem however of isolating the plate circuit from the press and Figs. 12 and 14 disclose two solutions for this problem. The tube 75 in Fig. 12 has a press 76 preferably of a somewhat four-leaf clover shape as shown in Fig. 13. The filament leads 77 extend upwardly to the height at which the electron emitting filament 79 extends horizontally between them. Partially surrounding this electron emitting portion 79 of the cathode are the two anodes 80 and 81 preferably similar to those disclosed in Fig. 1. These anodes have the two parallel wires 82 and 83 extending to the bridge 84 similar to the bridge 40 in Fig. 1. A flexible lead 85 extends from the interior of the tube to the high voltage direct current. In order to support this plate circuit from the press, the wires 82 and 83 are extended thereto and sealed or otherwise fastened therein. In order to isolate the plate circuit from the press, however, these wires 82 and 83 are shorted by a bridge 86 at approximately ¼ of a wave length from the anodes. This short section of a line ¼ of a wave length long offers infinite impedance to the oscillating voltage across the two plates.

Fig. 14 has a similar arrangement of anodes and cathodes but in place of having the wires 82 and 83 shorted by a bridge, these wires extend approximately a half a wave length from the anodes to the surface of the press and an open line ½ a wave length as shown offers also an infinite impedance to the oscillating voltage across the plates.

In Figs. 15 and 16, I have disclosed a structure which I found practical for use with very small wave lengths. In fact, a wave length of 1.75 centimeters was measured with this construction. The tube 90 has a reduced diameter portion 91 and has two cathode conductors 92 and 93 extending upwardly from the press 94 and has the electron emitting portion or filament 95 extending horizontally therebetween. This cathode structure is partially surrounded by the anodes 96 and 97 similar to the anodes in Fig. 1. These two anodes have the two parallel wires 98 and 99 connected thereto and shorted by the bridge 100 which is in turn supported by its connection 101 to and through the press 94. The tube is made very small. In fact the diameter of the portion 91 of the tube is approximately .35" and the tube has a length of 4". The lower portion of the cathode conducting leads is of .04" tungsten wire and the upper portion is of .015" tungsten wire. The connecting wire 101 is of .04" tungsten wire with the parallel wires 98, 99 of .025" tungsten wire.

In Fig. 18 I have disclosed the curves showing the change in output current with a variation in plate voltage. The output current was determined by having a sensitive detector subject to the radiations of the tube and the ordinates are the readings of the detector current which represents the output current of the tube. A detector was necessary on account of the small values to be determined. The tube is operated by modulating the plate voltage upon a straight line portion of the curve AB in Fig. 18 and the change produces a change in the output current.

Many variations can, of course, be made in the structure of the various elements of the tube. In Fig. 17, for example, I have disclosed two parallel flat plate anodes 102 and 103 in place of the anodes as disclosed in the other figures.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A device for generating oscillations comprising an evacuated envelope, a cathode, a plurality of anodes symmetrical with respect to said cathode, a pair of conductors connected to said anodes and extending parallel to one another, a non-inductive bridge shorting said parallel conductors within said envelope and a conductor extending from the electrical center of said bridge to the exterior of said envelope.

2. A device for generating oscillations comprising an evacuated envelope, a cathode, a plurality of anodes symmetrical with respect to said cathode, a pair of conductors connected to said anodes and extending parallel to one another, a bridge shorting said parallel conductors within said envelope and a conductor extending from said bridge to the exterior of said envelope, a portion of the exterior wall of the envelope adjacent said parallel conductors being constricted closely to said conductors whereby a close inductive coupling may be made with an exterior circuit.

3. A device for generating oscillations comprising an evacuated envelope, a cathode, a plurality of anodes symmetrical with respect to said cathode, a pair of conductors connected to said anodes and extending parallel to one another, and a disc symmetrically terminating said parallel conductors within the envelope.

4. A device for generating oscillations comprising an evacuated envelope, a cathode, a plurality of anodes symmetrical with respect to said cathode, a pair of conductors connected to said anodes and extending parallel to one another, and a disc symmetrically terminating said parallel conductors within the envelope and a conductor from a point symmetrical with the ends of said parallel conductors to the exterior of said envelope.

5. An oscillating device comprising an elongated tube having a cathode at right angles to the longitudinal axis of the tube, two anodes symmetrical with said cathode and magnetic means having pole pieces terminating outside said tube adjacent the ends of said cathode, said cathode and the lines of flux across said pole pieces being at an acute angle to each other.

6. A device for generating oscillations comprising an evacuated envelope, a cathode, a plurality of anodes, conductors connected to said anodes and extending parallel to each other, a bridge shorting said conductors and an oscillatory circuit within said tube consisting of said bridge, conductors, anodes and cathode, the wave length of said oscillatory circuit depending on the flying time of electrons between said cathode and anodes.

7. A device for generating oscillations comprising an evacuated envelope, a cathode, a plurality of anodes, conductors connected to said anodes and extending parallel to each other, a bridge shorting said conductors, an oscillatory circuit within said tube consisting of said bridge, conductors, anodes and cathode, the wave length of said oscillatory circuit depending on the flying time of electrons between said cathode and anodes, and an exterior output loop coupled inductively only with said interior oscillatory circuit.

8. A device for generating short wave oscillations comprising an evacuated envelope, a cathode, a plurality of anodes, conductors connecting an anode to another anode, a short wave oscillatory circuit consisting of said conductors, anodes, cathode and the space between said cathode and anodes, the wave length of the current in said circuit being dependent on the flying time of an electron across the space between said cathode and anodes, said oscillatory circuit being entirely within said container, said envelope having only input connections sealed through said envelope for power input only to the electrodes therein.

GEORGE R. KILGORE.